Sept. 18, 1962 T. O. MATHUES 3,054,213
PANEL AND TRIM MEANS
Filed Jan. 14, 1960

INVENTOR.
Thomas O. Mathues
BY
Albert H. Reuther
His Attorney

United States Patent Office 3,054,213
Patented Sept. 18, 1962

3,054,213
PANEL AND TRIM MEANS

Thomas O. Mathues, Dayton, Ohio, assignor to General Motors Corporation, Detroit, Mich., a corporation of Delaware
Filed Jan. 14, 1960, Ser. No. 2,383
1 Claim. (Cl. 45—138)

This invention relates to panel mountings and, more particularly, to water proof seal means and manufacture thereof for use as protection relative to mounting panels.

An object of this invention is to provide a new and improved panel sealing means inexpensive to make and convenient to use in place of messy and difficult to handle materials that hinder mass production efficiency and that often are difficult to apply properly as well as adequately relative to a panel mounting.

Another object of this invention, is to provide an extruded longitudinally-extending self-sealing washer means made by continuously forming a gasket-like multi-pocket strip of pillow-like portions, each including a soft non-curing filler mass of material such as rubber-like asphaltic, plastic resin material and the like contained in between an extruded covering of soft, solid material such as synthetic or natural rubber, curable plastic material and the like which is transversely pinched together at predetermined intervals to form small pillow-like portions, each having a soft center that can be punctured while the pillow-like portions can be severed from each other as well as left together in strip form for use in sealing mounting apertures relative to which clip, pin, as well as screw fastening means and the like have to be fitted so as to hold a panel relative to a mounting.

Another object of this invention is to provide in combination a sheet-metal mounting member having apertures therein along a peripheral edge such as on a motor vehicle door panel relative to which a fibrous panel or fabric door trim means is to be held by fastening devices such as spring clips, screws, and the like insertable in the apertures and simultaneously adopted to puncture individual pillow-like portions of a gasket-like multi-pocket strip including an external covering that retains a soft non-curing filler mass of material such as rubber-like, asphaltic, plastic resin material and the like that is sufficiently flowable to serve as a self-sealing washer closing off the sheet metal apertures which can then permit driving of the fastening device anywhere through the panel or trim means without creating a place for leakage of liquid such as water from which the trim means is protected even though the apertures can be larger than the fastening device as well as poorly located relative thereto.

A further object of this invention is to provide a continuous, tubular means having pillow-like pocket portions provided at intervals coinciding substantially with locations where sheet metal fastening devices are inserted relative to a trim panel sufficiently aligned with predetermined pockets so as to puncture a covering of the tubular means for permitting flow of a central filling of at least one pocket portion relative to peripheral edges of a mounting aperture as well as each fastening device, the pocket portions being separable if necessary from the tubular means along transverse junctures such that the trim panel is protected against soiling due to passage of foreign material like water, dirt and the like through apertures of a mounting member adapted to carry the fastening devices and trim panel.

Another object of this invention is to provide a method of manufacturing a gasket-like multi-pocket strip including pillow-like portions by steps including extruding of a continuous tubular covering means through a suitable die means, simultaneously filling space centrally inside the covering means with a non-curing soft center material supplied centrally through the die means, pinching the tubular covering together at predetermined locations so as to form pillow-like portions each having a soft center filling of the non-curing material, curing the tubular covering in a fluid medium such as in a steam retort and the like, and optionally severing pillow portions along seam-like junctures as needed to seal apertures with center filling ruptured from the pillow-like portions relative to fastening devices that hold panels together in weather proof condition around the apertures and fastening devices.

Further objects and advantages of the present invention will be apparent from the following description, reference being had to the accompanying drawings wherein preferred embodiments of the present invention are clearly shown.

Figure 1:
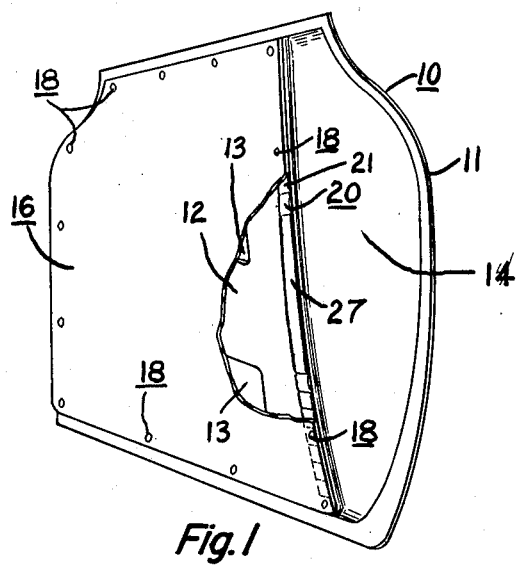
FIGURE 1 is a perspective view of a mounting and trim panel for a vehicle door fitted with panel sealing means in accordance with the present invention.

In various locations on motor vehicles, for example, there is need for protection around sheet metal screws or fastening devices used to hold trim means or panels in position relative to a mounting member. For instance, during fabrication of motor vehicle doors such as generally indicated by numeral 10 in FIGURE 1, there is provided an outer sheet metal portion 11 having a predetermined shape and contour in accordance with vehicle styling and function as well as an inner sheet metal mounting member or portion 12 having predetermined cutouts such as 13 and a laterally outwardly extending flange portion 14 joined to the outer sheet metal 11 by any suitable means such as welding. The cut outs 13 provide access to accessories or window lift actuators that can be provided to move windows (not shown) up and down relative to a door such as 10. The cutouts 13 also reduce weight of doors and are generally covered by a fibrous panel or fabric door trim means generally indicated by numeral 16. The panel or trim means 16 is generally held in a fixed position relative to the mounting or member 12 by means of fastening devices generally indicated by numeral 18. The fastening means can be in the form of wire spring-like clips having head portions partially embedded in the trim means or can be rivet-like pins as well as screws insertable through the panel or trim means as well as through a relatively larger aperture or rectangular opening in the mounting or sheet metal member 12. Because the apertures or openings along outer peripheral edges of the inner door sheet metal or mounting 12 are usually larger than the fastening means, there are sheet metal nuts or elements fitted to be movable a limited amount relative to these apertures or openings and provided immediately adjacent thereto. One of these nuts or elements of sheet metal is generally indicated by numeral 19 in the view of FIGURE 3. Any suitable sheet metal nut or fastening element 19 can be provided and further details of examples thereof can be found in U.S. Patents 2,150,852 Tinnerman, 2,221,498 Tinnerman as well as 2,246,022 Tinnerman and the like. An example of snap fastener means that also can be used can be seen in Patent 2,560,530 Burdick.

Figure 2:
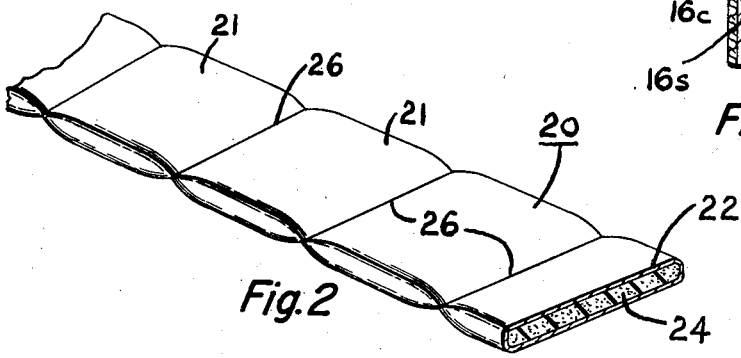
FIGURE 2 is a perspective view of sealing means in accordance with the present invention.

In accordance with the present invention, there is provided an extruded longitudinally-extending self-sealing washer means or continuous tubular means generally indicated by numeral 20 illustrated variously in each of the views of the drawing. This washer means or continuous tubular means 20 is a gasket-like multi-pocket strip including one or more pillow-like portions 21 including an external covering 22 as well as a relatively softer non-curing filler mass or center material 24 visible in FIGURES 2 and 3. The covering 22 is a relatively thin exterior skin or casing of natural or synthetic rubber and even curable plastic resin materials. The center material or filler mass 24 is a slightly flowable, non-curing latex or rubber-like, asphaltic, soft plastic resin material and the like retained within confines of the covering 22. To make the pillow-like portions 21 of the gasket-like strip separable in predetermined locations, the covering 22 is pinched together into seams or junctures 26 transversely located relative to the longitudinally extruded washer or tubular means. Provision of these junctures or seams 26 at predetermined longitudinally spaced intervals and extending transversely relative to the washer or tubular means assures against uneven disposition of filler material such as 24 wherever filler material is injected inside the covering 22.

Figure 3:
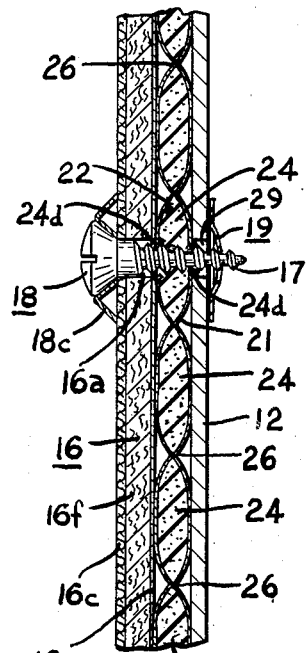
FIGURE 3 is a cross-sectioned elevational and enlarged view of an installation of panel sealing means in accordance with the present invention.

It is to be understood that filler material 24 can be fed continuously into confines of the covering 22 during extrusion thereof and also that supply of the filler material can be programed or controlled such that pockets 21 are provided for a predetermined length and then a continuously pinched or restricted and internally empty portion such as 27 visible in FIGURE 1 can be provided. Whenever a continuously pinched portion such as 27 is provided, the sealing washer or tubular means 20 is extruded in a manner such that at least one or more pockets 21 are formed to coincide in spacing with holes or apertures such as 29 visible in FIGURE 3. The sheet metal nuts or elements, 19, are engaged by a threaded portion 17 of the fastening means 18. In accordance with the present invention, the covering 22 is pierced or ruptured by the fastening means having a threaded portion such as 17 or having spring metal clip or finger portions insertable through an aperture such as 16a of the trim means 16 as shown in FIGURE 3. Due to rupture of the covering 22, there is a limited flow of the filler material 24 into space in between the fastener means and aperture 16a as well as holes such as 29. This limited flow is represented by diffused portions 24d of filler material as shown in FIGURE 3. These diffused portions 24d effect localized sealing of apertures or holes to protect against leakage of foreign material such as dirt, dust, as well as water relative to the trim means or panel 16.

Figure 2A:
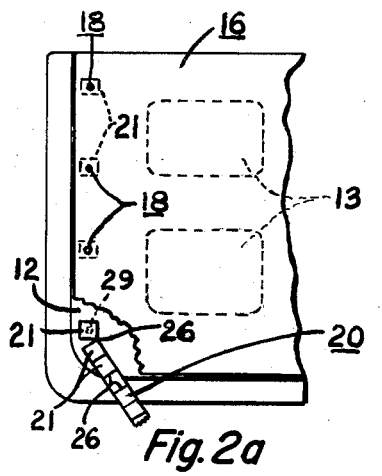
FIGURE 2a illustrates another panel sealing means installation in accordance with the present invention.

It is to be understood that the pockets 21 are severable from each other along seams or junctures 26 by cutting therealong using a scissors or knife or by tearing in the event the pinching is such that the covering 22 along these junctures is sufficient to permit manual pulling apart of pockets or pillow-like portions 21 along these junctures. FIGURE 2a illustrates use of the washer strip or tubular means 20 in the manner such that pockets or pillow-like portions 21 are separately fitted relative to holes or apertures and then the covering 22 is ruptured or pierced by fastening means such as 18 to effect sealing of the holes or apertures as described for FIGURE 3. In the lower left-hand corner of the view of FIGURE 2a, there is illustrated a partial tearing of adjacent pockets or pillow-like portions 21 from each other along a seam or juncture 26.

In the method of manufacturing the washer strip or tubular means 20, the covering 22 is extruded in hollow tube form through a cross-head tuber die together with a step of simultaneously filling the interior thereof by intermittently or continuously feeding soft center material through a central supply tube extending through the die.

An example of molding or extrusion apparatus suitable for this extrusion of covering 22 and central filler mass 24, reference can be made to U.S. Patent 2,716,778 Beare issued September 6, 1955, and belonging to the assignee of the present invention. The extruded covering and filler material passes onto a conveyor or belt as the former is ejected from the tuber and while passing over this conveyor or belt, there is a step of pinching the covering 22 transversely to form junctures or seams 26. The covering 22 is sufficiently tacky to assure joining of opposite sides of the covering 22 along the junctures or seams 26. The pinching effects forming of small pockets or pillows, each having a soft, non-curing center material therein. Next, there is curing of the cover material 22 in a steam retort or otherwise. Aforementioned Patent 2,716,778 illustrates a vulcanizing chamber and also a Patent 1,943,101 Wheatley illustrates a vulcanizing machine suitable to effect formation of raised portions similar to those required in providing seams or junctures 26 as well as continuously restricted or pinched portions 27 in accordance with the present invention. As indicated above, there is an optional step of cutting or severing pillow portions or pockets along seams as indicated in the lower left-hand corner of the view of FIGURE 2a. It is noted that during mass production of vehicle doors and trim panels in assembled relationship, only limited time is available to accomplish joining of parts. Generally, the holes or apertures such as 29 are stamped into sheet metal of the mounting or member 12 as relatively large and poorly located openings that are difficult and complicated to seal by use of caulking compound previously provided though often improperly and inadequately applied. In accordance with the present invention, a clean and convenient sealing operation is made available by the use of the pocket-like portions 21 that can be efficiently handled without messiness and that can be properly and adequately manufactured and supplied as prefabricated to meet needs of particular trim panel and mounting installations. The pockets or pillow-like portions 21 serve as rupturable, soft gasket or washer-like means to cover the entire sheet metal openings such as 29 and which can permit driving of a fastening means such as a spring clip or screw anywhere through the surface thereof without creating a place for entrance of foreign material such as dirt, dust, and rain water.

The trim means or panel 16 can include a leather-like embossed or plain synthetic or simulated as well as natural cloth 16c, visible in FIGURE 3, bonded or joined to a fibrous portion 16f or paper board coated with a suitable sealing layer 16s of material such as polyethylene and the like. Without provision of the dispersed portions 24d of filler material 24 relative to the fastening means and holes or apertures, there is danger that foreign material can leak and seep into the fibrous portion 16f and even relative to the cloth or plastic trim coverings 16c such that discoloration or separation of these portions occurs surrounding apertures 16a and around a cup-like washer 18c visible in FIGURE 3. It is to be understood that in place of the cup-like washer adjacent to a head portion of fastening means 18 there can also be a simulated button-like head on spring clip or rivet-like fastening means usable to secure the trim panel 16 relative to the mounting or member 12 of sheet metal. Also, it is to be understood that the self-sealing washer or tubular means can be used in locations other than for vehicle doors. For example, it can be used along corner panel portions of motor vehicles as well as on other trimmed or upholstered articles of manufacture.

While the embodiments of the present invention as herein disclosed constitute preferred forms, it is to be understood that other forms might be adopted.

What is claimed is as follows:

As a motor vehicle trim protection against deterioration due to irregularly-sized and thus irregularly-spaced holes punched into a sheet metal mounting member such as a door and the like along a peripheral edge thereof, a specific combination consisting of the sheet metal mounting member having irregularly-sized and thus irregularly-spaced holes therein, a fabric trim means adapted to be held substantially complementary to said mounting member, a plurality of fastening devices to hold said trim means adjacent to said mounting member, and a gasket-like multi-pocket sealing strip means including a covering of rubber-like material having substantially rectilinearly-shaped pillow-like portions individually rupturable by said fastening devices, and a non-curing filler mass of soft, rubbery, plastic, asphaltic material and the like in each of said pillow-like portions and adapted to disperse and seal the irregularly-sized and irregularly spaced holes as said fastening means rupture said covering in any location of the pillow-like portions regardless of discrepancy in alignment and fit of said fabric trim means and fastening devices with respect to the irregularly-sized and thus irregularly-spaced holes of the sheet metal mounting member.

References Cited in the file of this patent
UNITED STATES PATENTS

| | | |
|---|---|---|
| 1,242,562 | Laskey | Oct. 9, 1917 |
| 1,468,468 | Graebner | Sept. 18, 1923 |
| 2,142,505 | Gammeter | Jan. 3, 1939 |
| 2,485,643 | Norquist | Oct. 25, 1949 |
| 2,565,698 | Patterson | Aug. 28, 1951 |
| 2,666,354 | Dim et al. | Jan. 19, 1954 |
| 2,716,778 | Beare | Sept. 6, 1955 |
| 2,764,862 | Rado | Oct. 2, 1956 |
| 2,898,634 | Alderfer | Aug. 11, 1959 |
| 2,903,829 | Wolff | Sept. 15, 1959 |
| 2,910,730 | Risch | Nov. 3, 1959 |